(12) United States Patent
Ito et al.

(10) Patent No.: US 9,766,568 B2
(45) Date of Patent: Sep. 19, 2017

(54) ULTRAVIOLET-CURABLE LIQUID DEVELOPER

(71) Applicant: CANON KABUSHIKI KAISHA, Tokyo (JP)

(72) Inventors: Junji Ito, Hiratsuka (JP); Naotake Sato, Sagamihara (JP); Yasuhiro Aichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/666,760

(22) Filed: Mar. 24, 2015

(65) Prior Publication Data

US 2015/0192875 A1 Jul. 9, 2015

Related U.S. Application Data

(63) Continuation of application No. PCT/JP2014/080519, filed on Nov. 18, 2014.

(30) Foreign Application Priority Data

Nov. 28, 2013 (JP) ................................. 2013-246808

(51) Int. Cl.

| | |
|---|---|
| *G03G 9/13* | (2006.01) |
| *G03G 9/12* | (2006.01) |
| *C08F 2/50* | (2006.01) |
| *G03G 9/125* | (2006.01) |
| *C08F 216/12* | (2006.01) |
| *C08F 216/14* | (2006.01) |
| *C08F 216/16* | (2006.01) |

(52) U.S. Cl.
CPC ............... *G03G 9/12* (2013.01); *C08F 2/50* (2013.01); *C08F 216/12* (2013.01); *G03G 9/125* (2013.01); *G03G 9/13* (2013.01); *G03G 9/131* (2013.01); *C08F 216/125* (2013.01); *C08F 216/1416* (2013.01); *C08F 216/16* (2013.01)

(58) Field of Classification Search
CPC .................................. G03G 9/12; G03G 9/13
See application file for complete search history.

(56) References Cited

U.S. PATENT DOCUMENTS

| | | |
|---|---|---|
| 5,364,726 A | 11/1994 | Morrison et al. |
| 5,395,724 A | 3/1995 | Morrison et al. |
| 6,959,986 B2 | 11/2005 | Ushirogouchi et al. |
| 8,680,268 B2 | 3/2014 | Murai et al. |
| 2006/0274136 A1* | 12/2006 | Ushirogouchi ........ B41J 2/0057 347/102 |
| 2007/0042291 A1 | 2/2007 | Sato |
| 2009/0324269 A1* | 12/2009 | Iraqi ........................ G03G 9/12 430/115 |
| 2010/0055602 A1* | 3/2010 | Teshima ............. G03G 9/08755 430/114 |
| 2010/0068478 A1* | 3/2010 | Humpert .................. G03G 9/12 428/195.1 |
| 2011/0183254 A1* | 7/2011 | Shoshi ................... G03G 15/10 430/112 |
| 2013/0209933 A1 | 8/2013 | Sato et al. |

FOREIGN PATENT DOCUMENTS

| | | |
|---|---|---|
| JP | 4-336543 A | 11/1992 |
| JP | 6-236078 A | 8/1994 |
| JP | 2003-57883 A | 2/2003 |
| JP | 3442406 B2 | 9/2003 |
| JP | 2004-2668 A | 1/2004 |
| JP | 2004-217748 A | 8/2004 |
| JP | 2012-141463 | 7/2012 |
| JP | 2013-152348 A | 8/2013 |
| JP | 2013-220627 A | 10/2013 |
| WO | 2011/087011 A1 | 7/2011 |

OTHER PUBLICATIONS

Herbst, et al., "Industrial Organic Pigments", 3rd. ed., 2004, pp. 1-660.

\* cited by examiner

*Primary Examiner* — Hoa V Le

(74) *Attorney, Agent, or Firm* — Fitzpatrick Cella Harper and Scinto

(57) ABSTRACT

An ultraviolet-curable liquid developer contains a cationically polymerizable liquid monomer, a photoinitiator, and a toner particle insoluble in the cationically polymerizable liquid monomer. The cationically polymerizable liquid monomer is a vinyl ether compound, and the photoinitiator is a compound having a particular structure.

21 Claims, No Drawings

ULTRAVIOLET-CURABLE LIQUID DEVELOPER

CROSS-REFERENCE TO RELATED APPLICATIONS

This application is a Continuation of International Patent Application No. PCT/JP2014/080519, filed Nov. 18, 2014, which claims the benefit of Japanese Patent Application No. 2013-246808, filed Nov. 28, 2013, both of which are hereby incorporated by reference herein in their entirety.

TECHNICAL FIELD

The present invention relates to a liquid developer used in image forming apparatuses that use an electrophotographic process such as electrophotography, electrostatic recording, or electrostatic printing.

BACKGROUND ART

The electrophotographic process is a method for obtaining a printed matter, the method including:
uniformly charging a surface of an image carrier such as a photosensitive member (charging step),
forming an electrostatic latent image on the surface of the image carrier by exposure (exposing step),
developing the formed electrostatic latent image using a developer containing colored resin particles (developing step),
transferring the developer image onto a recording medium such as paper or a plastic film (transferring step), and
fixing the transferred developer image on the recording medium (fixing step). In this case, the developer is broadly classified into a dry developer that uses colored resin particles composed of a material containing a coloring agent such as a pigment and a binder resin in a dry state and a liquid developer in which colored resin particles are dispersed in an electrical insulating liquid serving as a carrier liquid.

In recent years, color printing and high-speed printing have been increasingly demanded for image forming apparatuses that use an electrophotographic process, such as copiers, facsimiles, and printers. Since high-resolution and high-quality images are required in color printing, a developer that can form a high-resolution and high-quality image and is applicable to high-speed printing is needed.

A liquid developer is known as a developer having an advantage concerning the reproduction of color images. In such a liquid developer, the aggregation of colored resin particles does not readily occur during the storage, and thus a minute toner can be used. Therefore, such a liquid developer tends to provide excellent characteristics in terms of reproduction of thin-line images and tone reproduction. High-quality and high-speed digital printers that use an electrophotographic technique with a liquid developer and have such excellent characteristics have been enthusiastically developed. Under these circumstances, development of a liquid developer having better characteristics has been required.

There has been known a liquid developer in which colored resin particles are dispersed in an electrical insulating liquid such as a hydrocarbon organic solvent or a silicone oil. However, if the electrical insulating liquid remains on a recording medium such as paper or a plastic film, the image quality may considerably degrade and thus the electrical insulating liquid needs to be removed. The electrical insulating liquid is removed by a typical method in which the electrical insulating liquid is volatilized by adding thermal energy. However, such a method is not necessarily preferred in view of environment and energy saving because an organic solvent vapor may be emitted to the outside of the apparatus and a large amount of energy is required.

As a countermeasure, a method for curing an electrical insulating liquid through photopolymerization has been proposed. A photo-curable liquid developer is composed of a monomer or an oligomer having a reactive functional group as the electrical insulating liquid and also contains a photoinitiator dissolved therein. Such a photo-curable liquid developer is cured by reacting the reactive functional group through irradiation with light such as ultraviolet rays and thus is applicable to high-speed printing. Such a photo-curable liquid developer has been proposed in PTL 1. PTL 1 describes an acrylate monomer such as urethane acrylate as an example of the monomer having a reactive functional group.

However, an acrylate monomer has low volume resistivity and tends to decrease the potential of an electrostatic latent image in a developing step, which may cause difficulty in achieving a high image density and image blur (formation of an image with poor sharpness).

PTL 2 proposes that a curable liquid vehicle within a particular viscosity range and a particular resistance range is used as a curable electrical insulating liquid. Examples of the curable liquid vehicle include an epoxy compound, vinyl ether, and cyclic vinyl ether.

CITATION LIST

Patent Literature

PTL 1 Japanese Patent Laid-Open No. 2003-57883
PTL 2 Japanese Patent No. 3442406

A vinyl ether monomer tends to provide high volume resistivity and also has a high reaction rate. Therefore, the vinyl ether monomer is suitably used as a curable electrical insulating liquid, but use of both a photo-cationic initiator and an ionic photoacid generator is generally required. If the vinyl ether monomer and the ionic photoacid generator are mixed with each other, the volume resistivity considerably decreases compared with the case of a vinyl ether monomer alone. Therefore, when a liquid developer containing the vinyl ether monomer and the ionic photoacid generator is used, a high image density is not easily achieved and image blur is easily caused.

SUMMARY OF INVENTION

An object of the present invention is to provide a liquid developer that has solved the above problems.

That is, there is provided an ultraviolet-curable liquid developer in which a high image density is achieved and image blur is not easily caused and which has sufficient fixability.

The present invention relates to an ultraviolet-curable liquid developer containing a cationically polymerizable liquid monomer, a photoinitiator, and a toner particle insoluble in the cationically polymerizable liquid monomer, wherein the cationically polymerizable liquid monomer is a vinyl ether compound, and the photoinitiator is a compound represented by general formula (1).

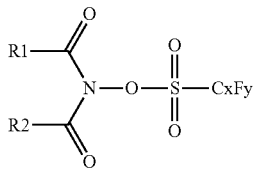

General formula (1)

In the general formula (1), x represents an integer of 1 to 8, y represents an integer of 3 to 17, and R1 and R2 bond to each other to form a ring structure.

Further features of the present invention will become apparent from the following description of exemplary embodiments.

DESCRIPTION OF EMBODIMENTS

Hereafter, the present invention will be described in detail.

An ultraviolet-curable liquid developer of the present invention contains a cationically polymerizable liquid monomer, a photoinitiator, and a toner particle insoluble in the liquid monomer.

Hereafter, each component contained in the ultraviolet-curable liquid developer of the present invention will be described.

[Photoinitiator]

The photoinitiator used in the present invention is represented by general formula (1).

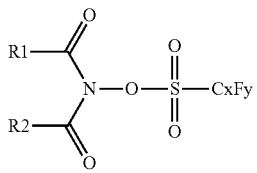

General formula (1)

In the general formula (1), x represents an integer of 1 to 8 and y represents an integer of 3 to 17. R1 and R2 bond to each other to form a ring structure.

Use of the photoinitiator represented by the general formula (1) allows good fixation, and also provides a high-resistance liquid developer unlike the case where an ionic photoacid generator is used.

The photoinitiator used in the present invention is subjected to photolysis through irradiation with ultraviolet rays and generates sulfonic acid, which is a strong acid. Alternatively, a sensitizer can be used together, and the absorption of ultraviolet rays by the sensitizer can trigger the decomposition of the initiator and the generation of sulfonic acid.

Examples of the ring structure formed by bonding R1 and R2 to each other include five-membered rings and six-membered rings. The ring structure may have, as a substituent, an alkyl group, an alkyloxy group, an alkylthio group, an aryl group, or an aryloxy group. In addition, another ring structure, such as an alicyclic structure, a heterocyclic structure, or an aromatic ring structure that may have a substituent, may be condensed.

The CxFy group with high electrophilicity is a carbon fluoride group, which is a functional group used for decomposing a sulfonic acid ester moiety through irradiation with ultraviolet rays. The number of carbon atoms is 1 to 8 (x=1 to 8) and the number of fluorine atoms is 3 to 17 (y=3 to 17).

When the number of carbon atoms is 1 or more, a strong acid is easily synthesized. When the number of carbon atoms is 8 or less, good storage stability is achieved. When the number of fluorine atoms is 3 or more, the effect as a strong acid can be provided. When the number of fluorine atoms is 17 or less, a strong acid is easily synthesized.

Examples of the CxFy group in the general formula (1) include linear alkyl groups in which hydrogen atoms are substituted with fluorine atoms (RF1), branched alkyl groups in which hydrogen atoms are substituted with fluorine atoms (RF2), cycloalkyl groups in which hydrogen atoms are substituted with fluorine atoms (RF3), and aryl groups in which hydrogen atoms are substituted with fluorine atoms (RF4).

Examples of the linear alkyl groups in which hydrogen atoms are substituted with fluorine atoms (RF1) include a trifluoromethyl group (x=1, y=3), a pentafluoroethyl group (x=2, y=5), a heptafluoro-n-propyl group (x=3, y=7), a nonafluoro-n-butyl group (x=4, y=9), a perfluoro-n-hexyl group (x=6, y=13), and a perfluoro-n-octyl group (x=8, y=17).

Examples of the branched alkyl groups in which hydrogen atoms are substituted with fluorine atoms (RF2) include a perfluoroisopropyl group (x=3, y=7), a perfluoro-tert-butyl group (x=4, y=9), and a perfluoro-2-ethylhexyl group (x=8, y=17).

Examples of the cycloalkyl groups in which hydrogen atoms are substituted with fluorine atoms (RF3) include a perfluorocyclobutyl group (x=4, y=7), a perfluorocyclopentyl group (x=5, y=9), a perfluoro cyclohexyl group (x=6, y=11), and a perfluoro(1-cyclohexyl)methyl group (x=7, y=13).

Examples of the aryl groups in which hydrogen atoms are substituted with fluorine atoms (RF4) include a pentafluorophenyl group (x=6, y=5) and a 3-trifluoromethyltetrafluorophenyl group (x=7, y=7).

Among the CxFy groups in the general formula (1), a linear alkyl group (RF1), a branched alkyl group (RF2), and an aryl group (RF4) is preferred and a linear alkyl group (RF1) and an aryl group (RF4) are further preferred in view of availability and ease of decomposition of a sulfonic acid ester moiety. In particular, a trifluoromethyl group (x=1, y=3), a pentafluoroethyl group (x=2, y=5), a heptafluoro-n-propyl group (x=3, y=7), a nonafluoro-n-butyl group (x=4, y=9), and a pentafluorophenyl group (x=6, y=5) are preferred.

Specific examples [example compounds A-1 to A-27] of the photoinitiator that can be used in the present invention are listed below, but the present invention is not limited to the examples.

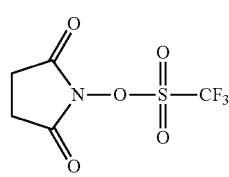

(A-1)

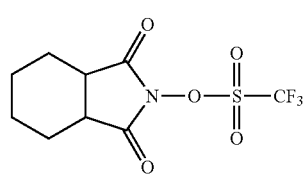

(A-2)

(A-3) 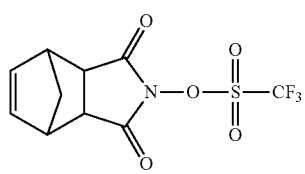
(A-4) 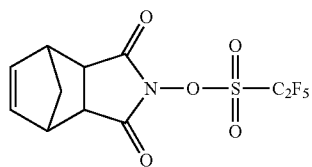
(A-5) 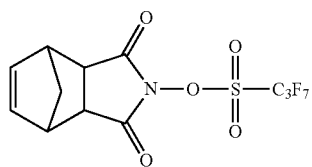
(A-6) 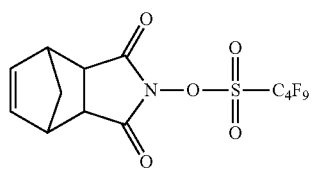
(A-7) 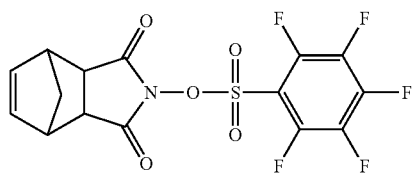
(A-8) 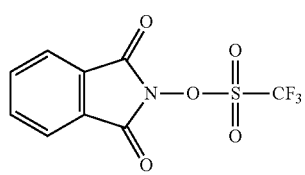
(A-9) 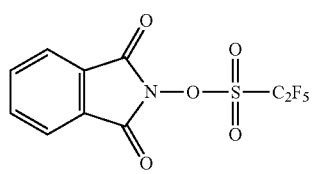
(A-10) 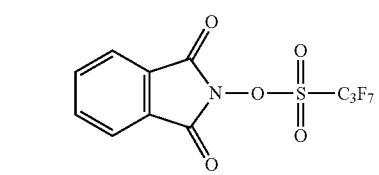
(A-11) 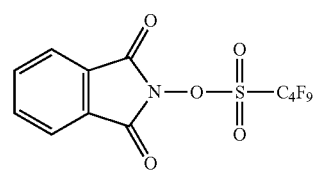
(A-12) 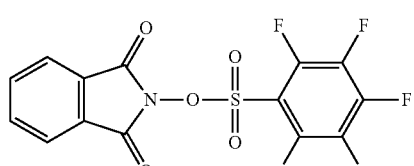
(A-13) 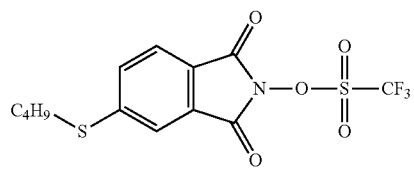
(A-14) 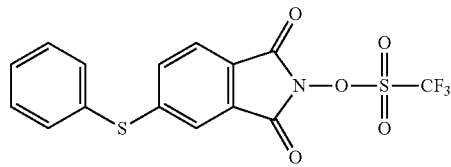
(A-15) 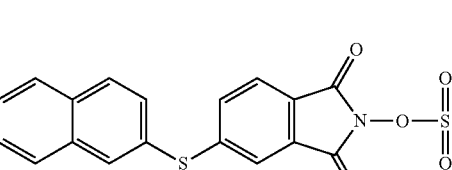
(A-16) 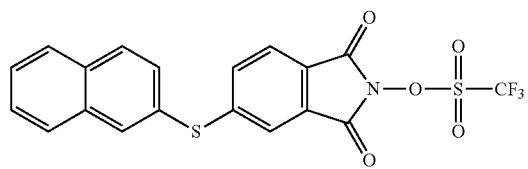
(A-17) 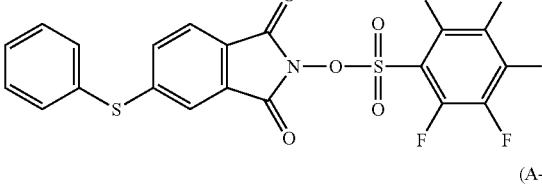
(A-18) 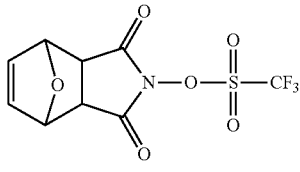
(A-19) 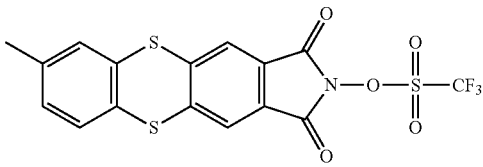

is not particularly limited, but is preferably 0.01 to 5 parts by mass relative to 100 parts by mass of the cationically polymerizable liquid monomer. The content is more preferably 0.05 to 1 part by mass and further preferably 0.1 to 0.5 parts by mass.

[Cationically Polymerizable Liquid Monomer]

In the ultraviolet-curable liquid developer of the present invention, a vinyl ether compound is used as the cationically polymerizable liquid monomer. Use of a vinyl ether compound can provide an ultraviolet-curable liquid developer having high electrical resistance, low viscosity, and high sensitivity. The present inventors assume that good characteristics are exhibited because of small deviation of electron density in a molecule of the vinyl ether compound.

An acrylic monomer, a cyclic ether monomer such as epoxy or oxetane, and the like have been widely used as the cationically polymerizable liquid monomer. However, an acrylic monomer has deviation of electron density in its molecule and an electrostatic interaction is exerted intermolecularly. Therefore, a low-viscosity liquid developer is not easily obtained, and the resistance tends to decrease. In the case of a cyclic ether monomer, high electrical resistance is not easily achieved, and the reaction rate is much lower than that of the vinyl ether compound. Thus, it is difficult to apply the cyclic ether monomer to the ultraviolet-curable liquid developer.

The cationically polymerizable liquid monomer is preferably a vinyl ether compound which does not have a heteroatom in a portion other than a vinyl ether group (CH$_2$=CH—O—). The heteroatom refers to an atom other than a carbon atom and a hydrogen atom. When the vinyl ether compound which does not have a heteroatom in a portion other than a vinyl ether group is used, the deviation of electron density in a molecule is suppressed and high electrical resistance is easily achieved.

Furthermore, the cationically polymerizable liquid monomer is preferably a vinyl ether compound which does not have a carbon-carbon double bond in a portion other than a vinyl ether group (CH$_2$=CH—O—). When the vinyl ether compound which does not have a carbon-carbon double bond in a portion other than a vinyl ether group is used, the deviation of electron density is suppressed and high electrical resistance is easily achieved.

Specific examples [example compounds B-1 to B-30] of the vinyl ether compound that can be used in the present invention are listed below, but the present invention is not limited to the examples.

The photoinitiators may be used alone or in combination of two or more. The content of the photoinitiator in the ultraviolet-curable liquid developer of the present invention

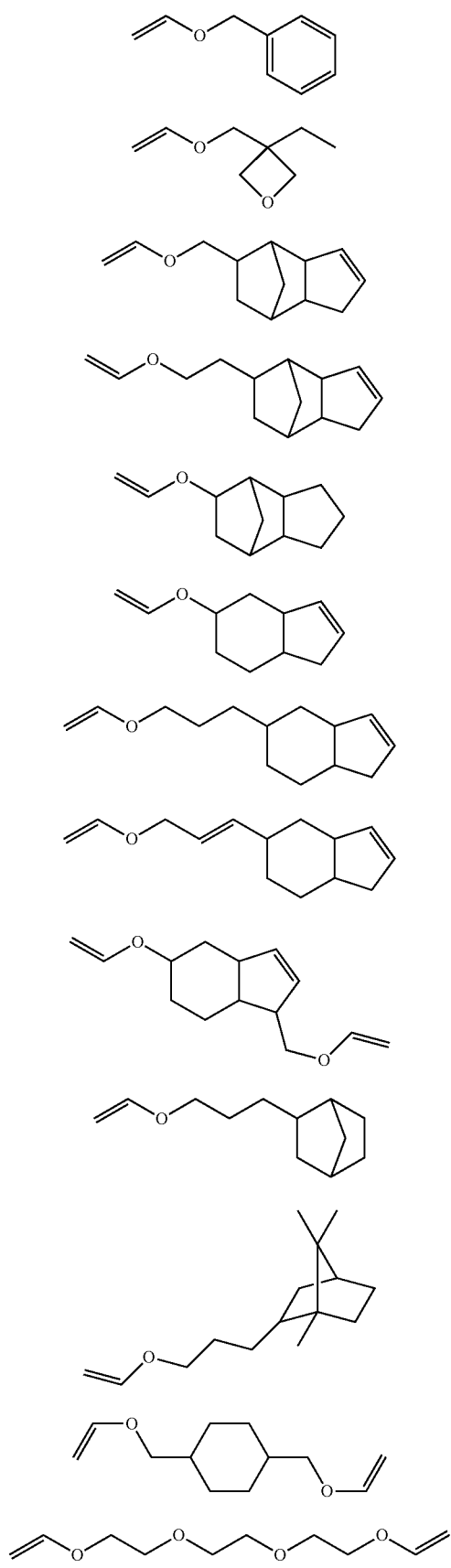
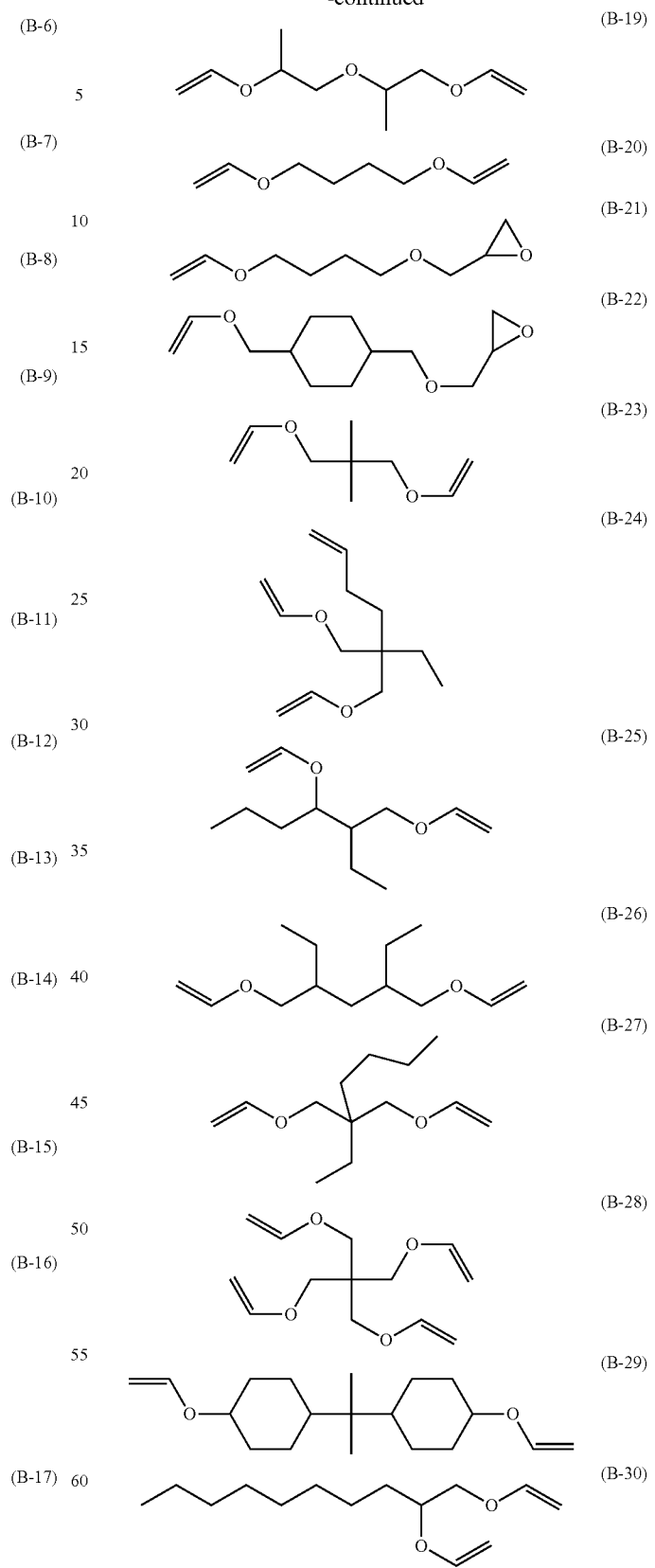
Among them, particularly preferred examples of the vinyl ether compound include dicyclopentadiene vinyl ether (B-8), cyclohexanedimethanol divinyl ether (B-17), tricyclodecane vinyl ether (B-10), trimethylolpropane trivinyl ether (B-24), 2-ethyl-1,3-hexanediol divinyl ether (B-25), 2,4-diethyl-1,5-pentanediol divinyl ether (B-26), 2-butyl-2-ethyl-1,3-propanediol divinyl ether (B-27), neopentyl glycol divinyl ether (B-23), pentaerythritol tetravinyl ether (B-28), and 1,2-decanediol divinyl ether (B-30).

[Toner Particle]

The ultraviolet-curable liquid developer of the present invention contains a toner particle insoluble in the cationically polymerizable liquid monomer. The toner particle contains a binder resin and a pigment, and may optionally contain a charge control agent.

The toner particle is produced by a publicly known method such as a coacervation method or a wet grinding method.

The details of the coacervation method are described in, for example, International Publications (WO2007/000974 and WO2007/000975). The details of the wet grinding method are described in, for example, International Publications (WO2006/126566 and WO2007/108485). In the present invention, such a publicly known method can be used.

The toner particle obtained by such a method preferably has a number-average particle size of 0.05 to 5 µm and more preferably has a number-average particle size of 0.05 to 1 µm in order to obtain a high-resolution image.

Binder Resin

The binder resin contained in the toner particle may be a publicly known binder resin that has fixability to an adherend, such as paper or a plastic film. Examples of the binder resin include epoxy resin, ester resin, acrylic resin, styrene-acrylic resin, alkyd resin, polyethylene resin, ethylene-acrylic resin, and rosin-modified resin. If necessary, these binder resins may be used alone or in combination of two or more.

The content of the binder resin is not particularly limited, but is preferably 50 to 1000 parts by mass relative to 100 parts by mass of the pigment.

Pigment

The pigment contained in the toner particle is not particularly limited. Any commercially available organic pigment and inorganic pigment can be used. Alternatively, a pigment can be dispersed in an insoluble resin or the like as a dispersion medium or a resin can be grafted on the surface of a pigment.

Examples of the pigment include pigments described in "Industrial Organic Pigments" by W. Herbst, K. Hunger.

Specific examples of the organic pigment and inorganic pigment that show yellow and can be used in the present invention include C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C.I. Vat Yellow 1, 3, and 20.

Specific examples of the pigment that shows red or magenta include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, and 269; C.I. Pigment Violet 19; and C.I. Vat Red 1, 2, 10, 13, 15, 23, 29, and 35.

Specific examples of the pigment that shows blue or cyan include C.I. Pigment Blue 2, 3, 15:2, 15:3, 15:4, 16, and 17; C.I. Vat Blue 6; C.I. Acid Blue 45; and a copper phthalocyanine pigment in which 1 to 5 phthalimidomethyl groups are substituted on a phthalocyanine skeleton.

Specific examples of the pigment that shows green include C.I. Pigment Green 7, 8, and 36.

Specific examples of the pigment that shows orange include C.I. Pigment Orange 66 and 51.

Specific examples of the pigment that shows black include carbon black, titanium black, and aniline black.

Specific examples of a white pigment include basic lead carbonate, zinc oxide, titanium oxide, and strontium titanate. Herein, titanium oxide has lower specific gravity, higher refractive index, and chemically and physically more stable than other white pigments, and thus has high hiding power and high tinting strength as a pigment. Furthermore, titanium oxide has high resistance to acids, alkalis, and other environments. Therefore, titanium oxide is preferably used as a white pigment. Obviously, other white pigments (which may be white pigments other than the listed white pigments) may also be optionally used.

The pigment in the toner particle may be dispersed by dispersion means according to the production method of the toner particle. Examples of a device that can be used as the dispersion means include a ball mill, a sand mill, an attritor, a roll mill, a jet mill, a homogenizer, a paint shaker, a kneader, an agitator, a Henschel mixer, a colloid mill, an ultrasonic homogenizer, a pearl mill, and a wet jet mill.

In the dispersion of the pigment, a dispersing agent may also be added. Examples of the dispersing agent include hydroxy group-containing carboxylates, salts of long-chain polyaminoamides and high-molecular-weight acid esters, salts of high-molecular-weight polycarboxylic acid, high-molecular-weight unsaturated acid esters, high-molecular-weight copolymers, modified polyacrylates, aliphatic polyhydric carboxylic acids, naphthalenesulfonic acid formalin condensates, polyoxyethylene alkylphosphates, and pigment derivatives. Furthermore, commercially available polymer dispersing agents such as Solsperse series manufactured by The Lubrizol Corporation are also preferably used.

A synergist suitable for the pigment may also be used as a dispersing aid. The amounts of the dispersing agent and dispersing aid added are preferably 1 to 50 parts by mass relative to 100 parts by mass of the pigment.

[Other Components]

The ultraviolet-curable liquid developer of the present invention preferably contains the following additives, if necessary.

Sensitizer

The ultraviolet-curable liquid developer of the present invention may optionally contain a sensitizer in order to, for example, improve the acid-generating efficiency of the photoacid generator and lengthen the photosensitive wavelength. Any sensitizer may be used as long as the photoinitiator is sensitized through electron-transfer mechanism or energy-transfer mechanism. Preferred examples of the sensitizer include aromatic polycondensed ring compounds such as anthracene, 9,10-dialkoxyanthracene, pyrene, and perylene; aromatic ketone compounds such as acetophenone, benzophenone, thioxanthone, and Michler's ketone; and heterocyclic compounds such as phenothiazine and N-aryl oxazolidinone. The amount of the sensitizer added is suitably selected in accordance with the purpose, and generally 0.1 to 10 parts by mass and preferably 1 to 5 parts by mass relative to 1 part by mass of the photoacid generator.

The ultraviolet-curable liquid developer of the present invention also preferably contains a sensitizing aid in order to improve the electron-transfer efficiency or energy-transfer efficiency between the sensitizer and the photoinitiator.

Specific examples of the sensitizing aid include naphthalene compounds such as 1,4-dihydroxynaphthalene, 1,4-dimethoxynaphthalene, 1,4-diethoxynaphthalene, 4-methoxy-1-naphthol, and 4-ethoxy-1-naphthol; and benzene compounds such as 1,4-dihydroxybenzene, 1,4-dimethoxybenzene, 1,4-diethoxybenzene, 1-methoxy-4-phenol, and 1-ethoxy-4-phenol.

The amount of the sensitizing aid added is suitably selected in accordance with the purpose, but is 0.1 to 10 parts by mass and preferably 0.5 to 5 parts by mass relative to 1 part by mass of the sensitizer.

Cationic Polymerization Inhibitor

The ultraviolet-curable liquid developer of the present invention may also contain a cationic polymerization inhibitor. The cationic polymerization inhibitor is, for example, an alkali metal compound and/or an alkaline-earth metal compound or an amine.

Preferred examples of the amine include alkanolamines, N,N-dimethylalkylamines, N,N-dimethylalkenylamines, and N,N-dimethylalkynylamines. Specific examples of the amine include triethanolamine, triisopropanolamine, tributanolamine, N-ethyldiethanolamine, propanolamine, n-butylamine, sec-butylamine, 2-aminoethanol, 2-methylaminoethanol, 3-methylamino-1-propanol, 3-methylamino-1,2-propanediol, 2-ethylaminoethanol, 4-ethylamino-1-butanol, 4-(n-butylamino)-1-butanol, 2-(t-butylamino)ethanol, N,N-dimethylundecanol, N,N-dimethyldodecanolamine, N,N-dimethyltridecanolamine, N,N-dimethyltetradecanolamine, N,N-dimethylpentadecanolamine, N,N-dimethylnonadecylamine, N,N-dimethylicosylamine, N,N-dimethyleicosylamine, N,N-dimethylheneicosylamine, N,N-dimethyldocosylamine, N,N-dimethyltricosylamine, N,N-dimethyltetracosylamine, N,N-dimethylpentacosylamine, N,N-dimethylpentanolamine, N,N-dimethylhexanolamine, N,N-dimethylheptanolamine, N,N-dimethyloctanolamine, N,N-dimethylnonanolamine, N,N-dimethyldecanolamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, and N,N-dimethyloctadecylamine. In addition, a quaternary ammonium salt or the like may also be used. The cationic polymerization inhibitor is particularly preferably a secondary amine.

The amount of the cationic polymerization inhibitor added is preferably 10 to 5000 ppm based on the mass of the ultraviolet-curable liquid developer.

Radical Polymerization Inhibitor

The ultraviolet-curable liquid developer of the present invention may contain a radical polymerization inhibitor.

In the ultraviolet-curable liquid developer containing a vinyl ether compound, a trace amount of the photoinitiator is decomposed into a radical compound during the storage, and polymerization due to the radical compound is sometimes caused. To prevent such polymerization, a radical polymerization inhibitor is preferably added.

Examples of a radical polymerization inhibitor that can be used include phenol-based hydroxy group-containing compounds, quinones such as methoquinone (hydroquinone monomethyl ether), hydroquinone, and 4-methoxy-1-naphthol, hindered amine-based antioxidants, 1,1-diphenyl-2-picrylhydrazyl free radical, N-oxyl free radical compounds, nitrogen-containing heterocyclic mercapto compounds, thioether-based antioxidants, hindered phenol-based antioxidants, ascorbic acid, zinc sulfate, salts of thiocyanic acid, thiourea derivatives, saccharides, phosphoric acid-based antioxidants, nitrites, sulfites, thiosulfates, hydroxylamine derivatives, aromatic amines, phenylenediamines, imines, sulfonamides, urea derivatives, oximes, polycondensates of dicyandiamide and polyalkylenepolyamine, sulfur-containing compounds such as phenothiazine, complexing agents that use tetraazaannulene (TAA) as a base, and hindered amines.

To prevent the viscosity of the ultraviolet-curable liquid developer from being increased due to polymerization of the vinyl ether compound, the radical polymerization inhibitor is preferably a phenol, an N-oxyl free radical compound, 1,1-diphenyl-2-picrylhydrazyl free radical, phenothiazine, a quinone, and a hindered amine and more preferably an N-oxyl free radical compound.

The amount of the radical polymerization inhibitor added is preferably 1 to 5000 ppm relative to the ultraviolet-curable liquid developer of the present invention.

Charge Control Agent

The ultraviolet-curable liquid developer of the present invention may optionally contain a charge control agent. A publicly known charge control agent can be used. Specific examples of the compound include fats and oils such as linseed oil and soybean oil; alkyd resin, halogen polymers, aromatic polycarboxylic acid, acidic group-containing water-soluble dyes, oxidative condensates of aromatic polyamine; metallic soaps such as cobalt naphthenate, nickel naphthenate, iron naphthenate, zinc naphthenate, cobalt octanoate, nickel octanoate, zinc octanoate, cobalt dodecanoate, nickel dodecanoate, zinc dodecanoate, aluminum stearate, and cobalt 2-ethylhexanoate; metal sulfonates such as petroleum-based metal sulfonates and metal sulfosuccinates; phospholipids such as lecithin; metal salicylates such as metal t-butyl salicylate complexes; and polyvinylpyrrolidone resin, polyamide resin, sulfonic acid-containing resin, and hydroxybenzoic acid derivatives.

In addition, the colored resin dispersion body may optionally contain other additives.

Other Additives

In addition to the above-described components, the ultraviolet-curable liquid developer of the present invention may contain publicly known additives for the purpose of improving compatibility with recording media, storage stability, image stability, and other characteristics. For example, a surfactant, a lubricant, a filler, an antifoaming agent, an ultraviolet absorber, an antioxidant, an anti-fading agent, a fungicide, and an anticorrosive can be suitably selected and used.

[Preparation of Ultraviolet-Curable Liquid Developer]

The ultraviolet-curable liquid developer may be prepared by adding powdery toner particles to a cationically polymerizable liquid monomer. Alternatively, the ultraviolet-curable liquid developer may be prepared by dispersing toner particles a small amount of a cationically polymerizable liquid monomer and then adding the remaining cationically polymerizable liquid monomer so as to have a desired concentration. The cationically polymerizable liquid monomer used to disperse the toner particles in advance and the cationically polymerizable liquid monomer added later may be the same or different.

[Physical Properties of Ultraviolet-Curable Liquid Developer]

The ultraviolet-curable liquid developer of the present invention is preferably prepared so as to have the same physical properties as those of typical liquid developers. That is, when the concentration of the toner particles is 2 mass %, the viscosity of the ultraviolet-curable liquid developer is preferably 0.5 to 10 mPa·s at 25° C. in view of achieving appropriate electrophoretic mobility of the toner particles. The volume resistivity of the ultraviolet-curable liquid developer is preferably $1\times10^{10}$ to $1\times10^{13}$ Ωcm in order to prevent the potential of an electrostatic latent image from dropping. In the present invention, an ultraviolet-curable liquid developer that achieves a good ultraviolet-curing property and satisfies the above physical properties can be prepared.

[Image Forming Apparatus]

The ultraviolet-curable liquid developer of the present invention can be suitably used in typical image forming apparatuses that use an electrophotographic process.

Ultraviolet Light Source

The ultraviolet-curable liquid developer of the present invention is cured by irradiation with ultraviolet rays immediately after being transferred onto a recording medium. As a result, an image is fixed.

An ultraviolet light source that can be used is, for example, a mercury lamp, a metal halide lamp, an excimer laser, an ultraviolet laser, a cold-cathode tube, a hot-cathode tube, black light, or an LED (light emitting diode) and preferably a belt-shaped metal halide lamp, a cold-cathode tube, a hot-cathode tube, a mercury lamp, black light, or an LED.

The ultraviolet dose is preferably 0.1 to 1000 mJ/cm$^2$.

EXAMPLES

Hereafter, a method for producing a liquid developer according to the present invention will be further specifically described based on Examples. However, the present invention is not limited thereto within the spirit and scope of the present invention. In the following description, "part" and "%" mean "part by mass" and "mass %", respectively, unless otherwise specified.

Example 1

Preparation of Toner Particles

Into a separable flask, 25 parts of Nucrel N1525 (ethylene-methacrylic acid resin/manufactured by DUPONT-MITSUI POLYCHEMICALS CO., LTD.) and 75 parts of dodecylvinyl ether (example compound B-3) serving as a cationically polymerizable liquid monomer were inserted. The mixture was heated to 130° C. in an oil bath over 1 hour while being mixed using a three-one motor at 200 rpm. After the mixture was kept at 130° C. for 1 hour, the mixture was slowly cooled at a cooling rate of 15° C./h to prepare a toner particle precursor. The prepared toner particle precursor was a white paste.

Into a planetary bead mill (Classic Line P-6/Fritsch), 59.40 parts of the prepared toner particle precursor, 4.95 parts of Pigment Blue 15:3 serving as a pigment, 0.20 parts of aluminum tristearate serving as a charging aid, and 35.45 parts of dodecylvinyl ether (example compound B-3) were inserted together with zirconia beads having a diameter of 0.5 mm. After milling was performed at 200 rpm at room temperature for 4 hours, the zirconia beads were separated to obtain a toner particle dispersion body (solid content: 20 mass %, dodecylvinyl ether: 80 mass %). The toner particles contained in the obtained toner particle dispersion body had a number-average particle size of 0.85 μm (measured with Nanotrac 150 manufactured by NIKKISO CO., LTD.).

(Preparation of Liquid Developer)

An ultraviolet-curable liquid developer was prepared by adding, to 10.0 parts of the toner particle dispersion body, 0.1 parts of hydrogenated lecithin (Retinol S-10/manufactured by Nikko Chemicals Co., Ltd.) serving as a charge control agent, 89.7 parts of dipropylene glycol divinyl ether (example compound B-19) serving as a cationically polymerizable liquid monomer, and 0.2 parts of example compound A-3 serving as a photoinitiator.

[Evaluation]

(Volume Resistivity)

The volume resistivity was measured using R8340 manufactured by ADVANTEST CORPORATION.

(Developing Property)

An electrostatic pattern was formed on an electrostatic recording paper with a surface charge of 500 V. Development was performed with each liquid developer at a process speed of 20 mm/sec using a roller developing machine that uses a metal roller. The distance (developing gap) between the roller and the electrostatic recording paper was set to be 34 μm. The quality of the formed image was visually checked and evaluated on the basis of the following criteria.

Rank 5: A high-density and high-resolution image was formed.

Rank 4: Density unevenness or image blur was slightly observed.

Rank 3: Density unevenness or image blur was sparsely observed, but development was found to be good on the whole.

Rank 2: Severe density unevenness and image blur occurred and a good image was not formed.

Rank 1: Development was not completed.

(Fixability)

At 25° C., bar coating of each liquid developer was performed on a polyethylene terephthalate film using a wire bar (No. 6). Subsequently, the liquid developer was irradiated at a dose of 120 mJ/cm$^2$ (measured wavelength: 365 nm) using a high-pressure mercury lamp with a lamp output of 120 mW/cm$^2$ to form a cured film. The film surface immediately after curing was touched with a finger, and the tackiness of the surface was evaluated on the basis of the following criteria.

Rank 3: No tackiness.

Rank 2: Slightly tacky.

Rank 1: The film was detached when touched with a finger or was not cured.

Examples 2 to 14 and Comparative Examples 1 to 8

Ultraviolet-curable liquid developers were obtained in the same manner as in Example 1, except that the contents (part by mass) of the toner particle dispersion body prepared in Example 1, the charge control agent, the polymerizable liquid monomer, and the photoinitiator were changed to those listed in Table 1 and Table 2.

The same evaluation as in Example 1 was performed using the obtained liquid developers. Tables 1 and 2 show the evaluation results.

The polymerizable monomers and initiators used in Comparative Examples are as follows.

<Radically Polymerizable Monomer (C-1)>

1,6-hexanediol diacrylate (radically polymerizable monomer, manufactured by Osaka Organic Chemical Industry Ltd.)

<Photoinitiator (D-1)>

CPI-110P (triarylsulfonium salt-type photo-cationic initiator, manufactured by San-Apro Ltd.)

<Photoinitiator (D-2)>

WPI-113 (diphenyliodonium salt-type photo-cationic initiator, manufactured by Wako Pure Chemical Industries, Ltd.)

<Photoinitiator (D-3)>
Irgacure 369 (α-aminoalkylphenone-based photo-radical initiator, manufactured by BASF Japan Ltd.)

<Photoinitiator (D-4)>
Lucirin TPO (acylphosphine oxide-based photo-radical initiator, manufactured by BASF Japan Ltd.)

TABLE 1

|  |  | Ex. 1 | Ex. 2 | Ex. 3 | Ex. 4 | Ex. 5 | Ex. 6 |
|---|---|---|---|---|---|---|---|
| Toner particle dispersion body | | 10 | 10 | 10 | 10 | 10 | 10 |
| Polymerizable monomer | B-19 | 89.7 | | | | | |
| | B-8 | | 89.7 | | | | |
| | B-17 | | | 89.7 | | | |
| | B-10 | | | | 89.7 | | |
| | B-24 | | | | | 89.7 | |
| | B-25 | | | | | | 89.7 |
| | B-26 | | | | | | |
| | B-27 | | | | | | |
| | B-23 | | | | | | |
| | B-28 | | | | | | |
| | B-30 | | | | | | |
| | C-1 | | | | | | |
| Initiator | A-3 | 0.2 | 0.2 | 0.2 | 0.2 | 0.2 | 0.2 |
| | A-8 | | | | | | |
| | A-26 | | | | | | |
| | A-7 | | | | | | |
| | D-1 | | | | | | |
| | D-2 | | | | | | |
| | D-3 | | | | | | |
| | D-4 | | | | | | |
| Charge control agent | Hydrogenated lecithin | 0.1 | 0.1 | 0.1 | 0.1 | 0.1 | 0.1 |
| Volume resistivity (Ωcm) | | $4.5 \times 10^{10}$ | $1.2 \times 10^{11}$ | $3.3 \times 10^{11}$ | $2.5 \times 10^{11}$ | $2.1 \times 10^{12}$ | $3.8 \times 10^{11}$ |
| Developing property | | 3 | 4 | 5 | 5 | 5 | 5 |
| Fixability | | 3 | 3 | 3 | 3 | 3 | 3 |

|  |  | Ex. 7 | Ex. 8 | Ex. 9 | Ex. 10 | Ex. 11 |
|---|---|---|---|---|---|---|
| Toner particle dispersion body | | 10 | 10 | 10 | 10 | 10 |
| Polymerizable monomer | B-19 | | | | | |
| | B-8 | | | | | |
| | B-17 | | | | | |
| | B-10 | | | | | |
| | B-24 | | | | | |
| | B-25 | | | | | |
| | B-26 | 89.7 | | | | |
| | B-27 | | 89.7 | | | |
| | B-23 | | | 89.7 | | |
| | B-28 | | | | 89.7 | |
| | B-30 | | | | | 89.7 |
| | C-1 | | | | | |
| Initiator | A-3 | 0.2 | 0.2 | 0.2 | 0.2 | 0.2 |
| | A-8 | | | | | |
| | A-26 | | | | | |
| | A-7 | | | | | |
| | D-1 | | | | | |
| | D-2 | | | | | |
| | D-3 | | | | | |
| | D-4 | | | | | |
| Charge control agent | Hydrogenated lecithin | 0.1 | 0.1 | 0.1 | 0.1 | 0.1 |
| Volume resistivity (Ωcm) | | $3.2 \times 10^{11}$ | $3.3 \times 10^{11}$ | $2.2 \times 10^{11}$ | $6.5 \times 10^{11}$ | $5.1 \times 10^{11}$ |
| Developing property | | 5 | 5 | 5 | 5 | 5 |
| Fixability | | 3 | 3 | 3 | 3 | 3 |

Ex.: Example

TABLE 2

|  |  | Ex. 12 | Ex. 13 | Ex. 14 | C.E. 1 | C.E. 2 | C.E. 3 |
|---|---|---|---|---|---|---|---|
| Toner particle dispersion body | | 10 | 10 | 10 | 10 | 10 | 10 |
| Polymerizable monomer | B-19 | | | | | | |
| | B-8 | | | | | | |
| | B-17 | 89.7 | 89.7 | 89.7 | 89.9 | 88.9 | 84.9 |
| | B-10 | | | | | | |
| | B-24 | | | | | | |
| | B-25 | | | | | | |

TABLE 2-continued

| | | | | | | | |
|---|---|---|---|---|---|---|---|
| | B-26 | | | | | | |
| | B-27 | | | | | | |
| | B-23 | | | | | | |
| | B-28 | | | | | | |
| | B-30 | | | | | | |
| | C-1 | | | | | | |
| Initiator | A-3 | | | | | | |
| | A-8 | 0.2 | | | | | |
| | A-26 | | 0.2 | | | | |
| | A-7 | | | 0.2 | | | |
| | D-1 | | | | | 1 | 5 |
| | D-2 | | | | | | |
| | D-3 | | | | | | |
| | D-4 | | | | | | |
| Charge control agent | Hydrogenated lecithin | 0.1 | 0.1 | 0.1 | 0.1 | 0.1 | 0.1 |
| Volume resistivity (Ωcm) | | $2.9 \times 10^{11}$ | $3.1 \times 10^{11}$ | $2.4 \times 10^{11}$ | $1.2 \times 10^{13}$ | $5.1 \times 10^{7}$ | $2.6 \times 10^{7}$ |
| Developing property | | 5 | 5 | 5 | 5 | 1 | 1 |
| Fixability | | 3 | 3 | 3 | 1 | 2 | 3 |

| | | C.E. 4 | C.E. 5 | C.E. 6 | C.E. 7 | C.E. 8 |
|---|---|---|---|---|---|---|
| Toner particle dispersion body | | 10 | 10 | 10 | 10 | 10 |
| Polymerizable monomer | B-19 | | | | | |
| | B-8 | | | | | |
| | B-17 | 88.9 | 84.9 | | | |
| | B-10 | | | | | |
| | B-24 | | | | | |
| | B-25 | | | | | |
| | B-26 | | | | | |
| | B-27 | | | | | |
| | B-23 | | | | | |
| | B-28 | | | | | |
| | B-30 | | | | | |
| | C-1 | | | 87.4 | 79.9 | 79.9 |
| Initiator | A-3 | | | | | |
| | A-8 | | | | | |
| | A-26 | | | | | |
| | A-7 | | | | | |
| | D-1 | | | | | |
| | D-2 | 1 | 5 | | | |
| | D-3 | | | 2.5 | 10 | |
| | D-4 | | | | | 10 |
| Charge control agent | Hydrogenated lecithin | 0.1 | 0.1 | 0.1 | 0.1 | 0.1 |
| Volume resistivity (Ωcm) | | $5.6 \times 10^{7}$ | $2.9 \times 10^{7}$ | $1.1 \times 10^{9}$ | $3.6 \times 10^{8}$ | $2.2 \times 10^{8}$ |
| Developing property | | 1 | 1 | 2 | 1 | 1 |
| Fixability | | 2 | 3 | 2 | 3 | 3 |

Ex.: Example
C. E.: Comparative Example

As is clear from Tables 1 and 2, a large amount of an initiator that tends to decrease the volume resistivity needs to be used in order to achieve sufficient fixability in Comparative Examples 1 to 8 of the related art, and thus the developing property and the fixability are not compatible. In contrast, development can be performed while good fixability is achieved in Example 1 of the present invention.

It is also found from the comparison between Example 1 and Example 2 that a better developing property is achieved by using, as a cationically polymerizable liquid monomer, a vinyl ether compound which does not have a heteroatom in a portion other than a vinyl ether group.

It is also found from the comparison between Example 2 and Examples 3 to 14 that a better developing property is achieved by using, as a cationically polymerizable liquid monomer, a vinyl ether compound which does not have a double bond in a portion other than a vinyl ether group.

Example 15

An ultraviolet-curable liquid developer was obtained in the same manner as in Example 3, except that in the preparation of the toner particles, dodecylvinyl ether (example compound B-3) was changed to dipropylene glycol divinyl ether (example compound B-19).

The same evaluation as in Example 3 was performed using the obtained liquid developer. The evaluation results were as good as the evaluation results in Example 3.

According to the present invention, there can be provided an ultraviolet-curable liquid developer in which a high image density is achieved and image blur is not easily caused and which has sufficient fixability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. An ultraviolet-curable liquid developer comprising:
   a cationically polymerizable liquid monomer;
   a photoinitiator; and
   a toner particle insoluble in the cationically polymerizable liquid monomer, the toner particle containing a binder resin and a pigment, wherein the cationically polymerizable liquid monomer is a vinyl ether compound, and the photoinitiator is represented by formula (1),

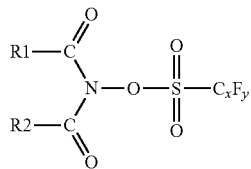
(1)

where R1 and R2 bond to each other to form a condensed ring structure, and the CxFy group is selected from the group consisting of a pentafluoroethyl group, a heptafluoro-n-propyl group, a nonafluoro-n-butyl group, a perfluoro-n-hexyl group, a perfluoro-n-octyl group, a perfluoroisopropvl group, a perfluoro-tert-butyl group, a perfluoro-2-ethylhexyl group, a perfluorocyclobutyl group, a perfluorocyclopentyl group, a perfluorocyclohexyl group, a perfluoro(1-cyclohexyl)methyl group, a pentafluorophenyl group and a 3-trifluoromethyltetrafluorophenyl group.

2. The ultraviolet-curable liquid developer according to claim 1, wherein the cationically polymerizable liquid monomer is a vinyl ether compound which has a vinyl ether group and does not have a heteroatom in a portion other than the vinyl ether group.

3. The ultraviolet-curable liquid developer according to claim 1, wherein the cationically polymerizable liquid monomer is a vinyl ether compound which has a vinyl ether group and does not have a double bond in a portion other than the vinyl ether group.

4. The ultraviolet-curable liquid developer according to claim 1, wherein the cationically polymerizable liquid monomer is selected from the group consisting of dicyclopentadiene vinyl ether, cyclohexanedimethanol divinyl ether, tricyclodecane vinyl ether, trimethylolpropane trivinyl ether, 2-ethyl-1,3-hexanediol divinyl ether, 2,4-diethyl-1,5-pentanediol divinyl ether, 2-butyl-2-ethyl-1,3-propanediol divinyl ether, neopentyl glycol divinyl ether, pentaerythritol tetravinyl ether, and 1,2-decanediol divinyl ether.

5. The ultraviolet-curable liquid developer according to claim 1, wherein $C_xF_y$ is selected from the group consisting of a pentafluoroethyl group, a heptafluoro-n-propyl group, a nonafluoro-n-butyl group, and a pentafluorophenyl group.

6. The ultraviolet-curable liquid developer according to claim 1, wherein the content of the binder resin in the toner particle is 50 to 1000 parts by mass relative to 100 parts by mass of the pigment in the toner particle.

7. The ultraviolet-curable liquid developer according to claim 1, wherein the volume resistivity of the ultraviolet-curable liquid developer is $1 \times 10^{10}$ to $1 \times 10^{13}$ Ωcm.

8. The ultraviolet-curable liquid developer according to claim 1, wherein a content of the photoinitiator is 0.01 to 5 parts by mass relative to 100 parts by mass of the cationically polymerizable liquid monomer.

9. The ultraviolet-curable liquid developer according to claim 1, wherein the vinyl ether compound is represented by formula (B-27)

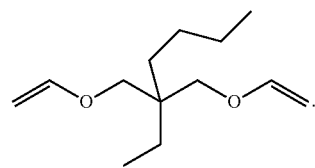
(B-27)

10. The ultraviolet-curable liquid developer according to claim 1, wherein the photoinitiator is represented by formula (A-26)

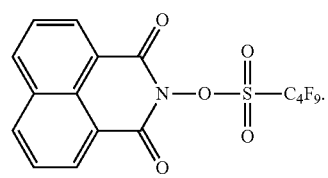
(A-26)

11. An ultraviolet-curable liquid developer comprising:
a cationically polymerizable liquid monomer;
a photoinitiator; and
a toner particle insoluble in the cationically polymerizable liquid monomer, the toner particle containing a binder resin and a pigment, wherein
the cationically polymerizable liquid monomer is a vinyl ether compound, and
the photoinitiator is represented by formula (A-26)

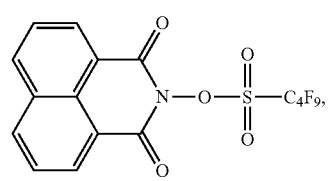
(A-26)

and
wherein the vinyl ether compound is represented by formula (B-27)

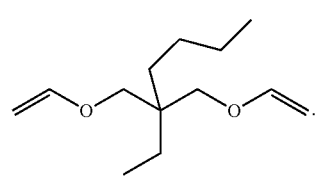
(B-27)

12. An image forming method by electrophotography, the method comprising the steps of:
charging a surface of an image carrier,
forming an electrostatic latent image on the surface of the image carrier by exposure,
developing the formed electrostatic latent image using an ultraviolet-curable liquid developer,
transferring the developer image onto a recording medium, and
fixing the transferred developer image on the recording medium by irradiation the transferred developer image with ultraviolet rays, wherein the ultraviolet-curable liquid developer comprises:
a cationically polymerizable liquid monomer;
a photoinitiator; and
a toner particle insoluble in the cationically polymerizable liquid monomer, the toner particle containing a binder resin and a pigment,
the photoinitiator being represented by formula (1),

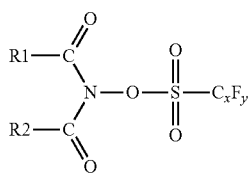

(1)

where x represents an integer of 1 to 8, y represents an integer of 3 to 17, and R1 and R2 bond to each other to form a ring structure.

13. The image forming method according to claim 12, wherein the cationically polymerizable liquid monomer is a vinyl ether compound which has a vinyl ether group and does not have a heteroatom in a portion other than the vinyl ether group.

14. The image forming method according to claim 12, wherein the cationically polymerizable liquid monomer is a vinyl ether compound which has a vinyl ether group and does not have a double bond in a portion other than the vinyl ether group.

15. The image forming method according to claim 12, wherein the cationically polymerizable liquid monomer is selected from the group consisting of dicyclopentadiene vinyl ether, cyclohexanedimethanol divinyl ether, tricyclodecane vinyl ether, trimethylolpropane trivinyl ether, 2-ethyl-1,3-hexanediol divinyl ether, 2,4-diethyl-1,5-pentanediol divinyl ether, 2-butyl-2-ethyl-1,3-propanediol divinyl ether, neopentyl glycol divinyl ether, pentaerythritol tetravinyl ether, and 1,2-decanediol divinyl ether.

16. The image forming method according to claim 12, wherein CxFy is selected from the group consisting of a trifluoromethyl group, a pentafluoroethyl group, a heptafluoro-n-propyl group, a nonafluoro-n-butyl group, and a pentafluorophenyl group.

17. The image forming method according to claim 12, wherein the content of the binder resin in the toner particle is 50 to 1000 parts by mass relative to 100 parts by mass of the pigment in the toner particle.

18. The image forming method according to claim 12, wherein the volume resistivity of the ultraviolet-curable liquid developer is $1 \times 10^{10}$ to $1 \times 10^{13}$ Ωcm.

19. The image forming method according to claim 12, wherein a content of the photoinitiator is 0.01 to 5 parts by mass relative to 100 parts by mass of the cationically polymerizable liquid monomer.

20. The ultraviolet-curable liquid developer according to claim 1, wherein the photoinitiator is represented by formula (A-4), (A-5), (A-6), (A-7), (A-9), (A-10), (A-11), (A-12), (A-16), (A-17), (A-24), (A-25), (A-26), or (A-27):

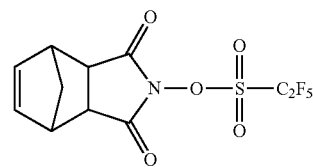
(A-4)

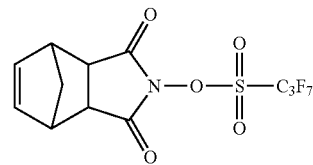
(A-5)

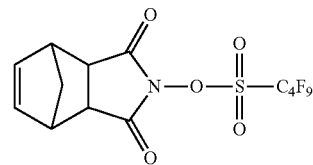
(A-6)

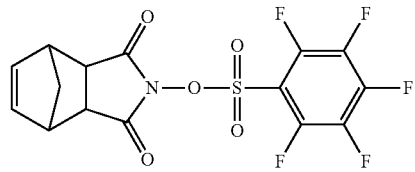
(A-7)

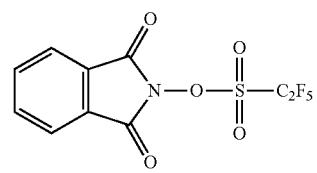
(A-9)

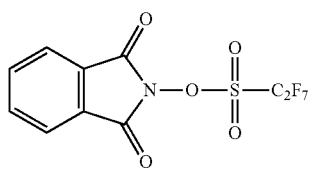
(A-10)

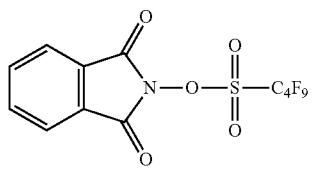
(A-11)

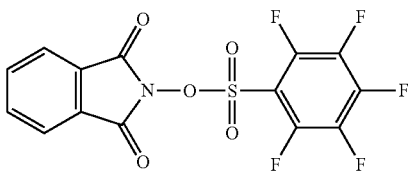
(A-12)

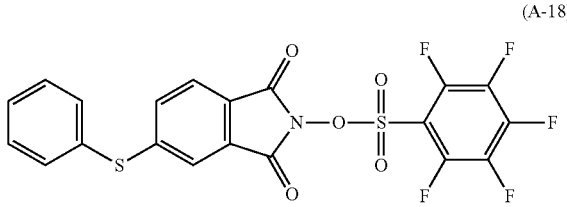
(A-18)

-continued
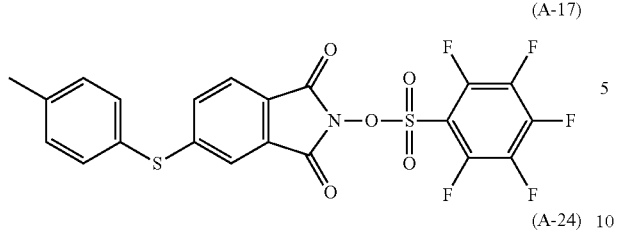
(A-17)
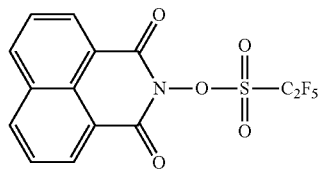
(A-24)
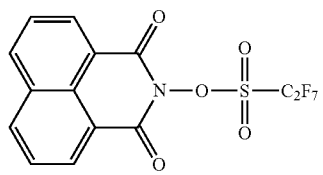
(A-25)
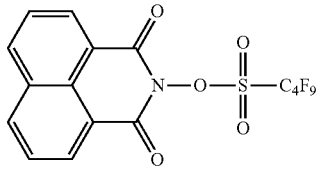
(A-26)
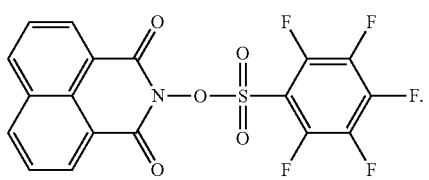
(A-27)
21. The ultraviolet-curable liquid developer according to claim 20, wherein the photoinitiator is represented by the formula (A-24), (A-25), (A-26), or (A-27).
* * * * *